US008631104B2

(12) United States Patent
Agrawal et al.

(10) Patent No.: US 8,631,104 B2
(45) Date of Patent: Jan. 14, 2014

(54) SYSTEM AND METHOD FOR QUALITY OF SERVICE MANAGEMENT IN MOBILE WIRELESS NETWORKS

(75) Inventors: Prathima Agrawal, New Providence, NJ (US); Shinichi Baba, Morristown, NJ (US); Faramak Vakil, Bedminster, NJ (US)

(73) Assignees: Toshiba America Research, Inc., Piscataway, NJ (US); Telcordia Technologies Inc., Piscataway, NJ (US)

( * ) Notice: Subject to any disclaimer, the term of this patent is extended or adjusted under 35 U.S.C. 154(b) by 1387 days.

(21) Appl. No.: 09/946,796

(22) Filed: Sep. 6, 2001

(65) Prior Publication Data

US 2003/0061351 A1    Mar. 27, 2003

(51) Int. Cl.
 *G06F 15/173* (2006.01)
(52) U.S. Cl.
 USPC .......................................... 709/223; 709/226
(58) Field of Classification Search
 USPC ......................................... 709/224, 223, 226
 See application file for complete search history.

(56) References Cited

U.S. PATENT DOCUMENTS

| 6,347,224 B1* | 2/2002 | Smyth et al. ................... 455/406 |
| 6,385,454 B1* | 5/2002 | Bahl et al. ...................... 455/450 |
| 6,716,101 B1* | 4/2004 | Meadows et al. ........... 455/456.1 |
| 6,950,656 B1* | 9/2005 | Bahk et al. ..................... 455/436 |
| 2003/0061351 A1* | 3/2003 | Prathima et al. ............... 709/226 |
| 2004/0057402 A1* | 3/2004 | Ramos et al. ................. 370/329 |

\* cited by examiner

*Primary Examiner* — Barbara Burgess
(74) *Attorney, Agent, or Firm* — Banner & Witcoff, Ltd.

(57) ABSTRACT

A system and method are provided by which a wireless network service provider is able to provide and maintain a high level of quality of service for terminals in the corresponding network, by overcoming problems that result in a diminished quality of service, including handoff delays as terminals move between cells in a network and the uncertainly as to which cell the individual terminals are moving to as they roam within the network. Providing and maintaining a high level of quality of service in a wireless network includes recording a history of movements of a terminal within the wireless network, analyzing the movements of the terminal within the wireless network to compute a probability distribution of the terminal's target location, and allocating network resources, including bandwidth and priority scheme, to the terminal based on the probability distribution for the terminal.

17 Claims, 4 Drawing Sheets

SYSTEM AND METHOD FOR QUALITY OF SERVICE MANAGEMENT IN MOBILE WIRELESS NETWORKS

BACKGROUND OF THE INVENTION

The present invention relates to wireless networks. More particularly, the invention relates to managing the quality of service (hereafter "QoS") in a wireless network.

As the use of mobile terminals in wireless networks increases, a serious challenge confronting wireless network service providers is providing and maintaining a high quality of services for their subscribers. In particular, in view of the expanding range of applications for mobile wireless terminals (which will be referred to simply as "terminals" henceforth), including video, audio and text applications, wireless network service providers must allocate sufficient bandwidth and assign appropriate scheduling (e.g., priority) schemes to the traffic of subscribing terminals on the end-to-end path of traffic across the network. The allocation of bandwidth determines the transfer speed of a terminal's application traffic across the network, and the scheduling determines the order of processing and transmission of the different application' traffic at network nodes. Examples of such network nodes include, but are not limited to, base stations and routers. A priority scheme provides an example of such scheduling, by providing one type of traffic precedent over another. For instance, in a network that supports both voice and data traffic, the priority schemes may assign voice traffic priority over data traffic. As a result the nodes in the example network transmit voice traffic packets before they transmit data packets. However, meeting this QoS challenge is made more difficult by the ever-increasing volume of network traffic, and the fact that the terminals are usually roaming around a given network and frequently change their points of connection to the network.

The challenge, noted above, of providing and maintaining the QoS in a wireless network is a difficult one due to the fact that the terminals are often roaming around the network and frequently change their points of attachment to the network.

As an example, consideration is given to a communication between the terminals of two subscribers to the services of a particular network, whereby at least one of the subscriber terminals is a mobile terminal. When a first terminal, which is a mobile terminal, attempts to contact the other subscriber terminal, which may be referred to as the "corresponding terminal", an end-to-end connection traversing a wireless/wireline infrastructure having sufficient resources, as well as an appropriate scheduling scheme is established between the two terminals. The end-to-end connection begins in the mobile terminal's present location in its present cell, which will be referred to as the "serving cell" hereafter. QoS for such connection is easily maintained so long as the mobile terminal remains in the serving cell.

However, as the mobile terminal moves from its serving cell to another cell, which will be referred to as a "target cell" hereafter, within the network, the network connection to the mobile terminal is handed off from the serving cell to the target cell. The hand off from the serving cell to the target cell interrupts the end-to-end connection between the two terminals, and thus QoS then becomes an issue of concern, for both the terminal users and the network providers.

In order to maintain a high level of QoS and to further ensure minimal disruption of an ongoing communication session, a new end-to-end connection that has sufficient bandwidth and an appropriate priority scheme must be established from the target cell between the mobile terminal and the corresponding terminal as quickly as possible.

Presently, maintaining a high level of QoS for an ongoing communication session by providing sufficient bandwidth and an appropriate priority scheme is not ensured after handoff from a service cell to a target cell due to at least a handoff delay or a bandwidth deficiency in the target cell. A handoff delay occurs when the time taken to set up a new end-to-end connection between the mobile terminal in the target cell and the corresponding terminal is so great that the communication session is disrupted, if not terminated altogether. Further, a bandwidth deficiency in the target cell prohibits completion of the connection between the mobile terminal and its corresponding terminal. As a result the communication session may be terminated because there is no transfer of information between the mobile terminal and its corresponding terminal.

Interruptions in communication sessions, in particular, may often be attributed to the network traffic management system not having sufficient notice of the target cell to which the mobile terminal is moving in time for the handoff to be handled efficiently. As a result, sufficient resources are not assured for the roaming terminal in a timely manner after the handoff to the target cell.

Thus, there is a need for a systems and technique that ensures that a high level QoS is provided and maintained for a mobile terminal's applications as the mobile terminal roams throughout a wireless network, the quality-of-service pertaining to, for example, the provision of sufficient bandwidth and appropriate priority schemes.

SUMMARY OF THE INVENTION

Thus, the present invention provides a system by which a wireless network service provider is able to provide and maintain a high level QoS for terminal' applications in the network, by overcoming the problems that result in a diminished quality of service, including handoff delays as terminals move between cells in a network and the uncertainly as to which cell the individual terminals are moving to as they roam within the network.

According to the present invention, providing and maintaining a high level of quality of service, which has threshold requirements, in a wireless network may include (a) recording a history of movements of a mobile terminal within the wireless network, (b) analyzing the movements of the mobile terminal within the wireless network to produce a probability distribution of the mobile terminal's target location, (c) predicting the target cell for the mobile terminal using the probability distribution of the mobile terminal's target location, and (d) transferring the context of the mobile terminal's ongoing communication session to the predicted target cell for allocating appropriate network resources thereto, including bandwidth and priority scheme.

BRIEF DESCRIPTION OF THE DRAWINGS

The scope of the present invention will be apparent from the following detailed description, when taken in conjunction with the accompanying drawing. The detailed description, while indicating preferred embodiments of the invention, are given as illustrations only since various changes and modifications within the spirit and scope of the invention will become apparent to those skilled in the art from this detailed description, in which.

DETAILED DESCRIPTION

In the detailed description to follow, example embodiments and values may be given, although the present invention is not limited thereto. Further, while example embodiments of the present invention will be described in conjunction with a system and method for managing quality of service (which will be referred to as "QoS" hereafter) in wireless networks as an example, practice of the present invention is not limited thereto, i.e., the present invention can be implemented in conjunction with any network.

Figure 1:
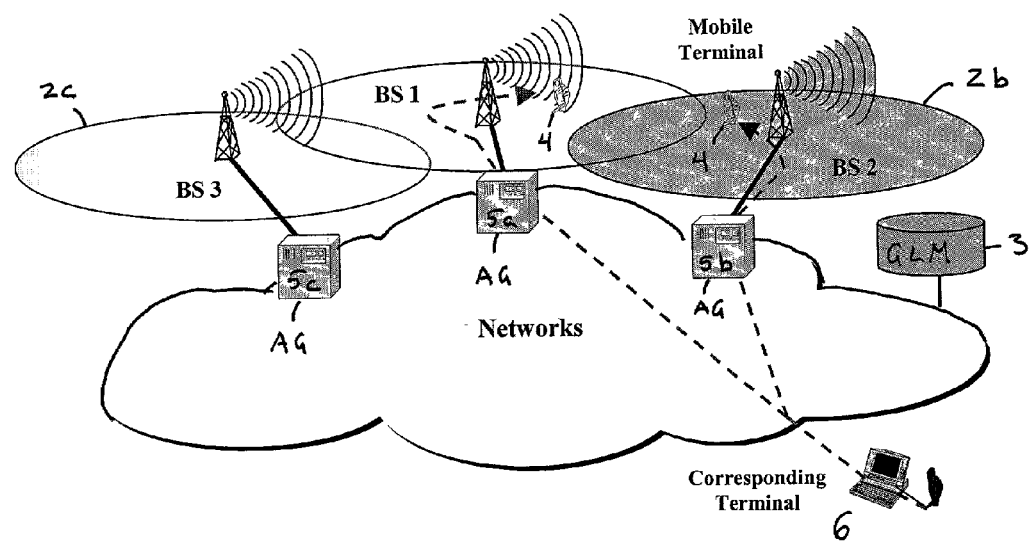
FIG. 1 shows an example of a wireless network in which the present invention may be utilized.

FIG. 1 shows an example of a wireless network in which the present invention may be utilized. The example wireless network of FIG. 1 may include a plurality of cells 2a, 2b and 2c that may provide a mobile terminal (hereinafter "terminal") that belongs to a subscriber of services provided by the network service provider with access to the network infrastructure, which may include, but is not limited to, an internet provider (IP) infrastructure. Each of base stations BS1, BS2 and BS3 may serve as a transmitting and receiving station for terminals in the respective cells 2a, 2b and 2c. The terminals may include, but are not limited to, telephones, pagers other wireless transmitting and receiving systems. Therefore, based upon the services offered by the respective network service providers, the respective base stations BS1, BS2 and BS3 may or may not serve as an IP router, that is, the respective base stations may or may not have IP routing and processing capabilities.

Access gateways AG1, AG2 and AG3, which may be provided for the respective cells 2a, 2b and 2c, are edge IP routing and control entities that connect one or more of the base stations BS1, BS2 and BS3 to the network 1. However, beyond the example network of the present application, it is noted that an access gateway may actually connect several base stations to a network, and further, in no way is the present invention limited to a network having only three cells or even a one-to-one ratio of base stations to cells.

The role of access gateways according to the present invention will be described by way of example only. For instance, if it has been determined that an ongoing communication session between a mobile terminal 4 and its corresponding terminal 6, which may be a mobile terminal or a fixed wire terminal, requires handoff from serving cell 2b to target cell 2a, the session context may be transferred from the access gateway 5b in the serving cell 2b to the access gateway 5a in the target cell 2a. The session context may include the radio resources and/or state information that is used to establish a connection for supporting an ongoing communication session. The access gateway 5a in the target cell 2a may use the transferred session context to establish a connection with sufficient resources between itself (i.e., the access gateway 5a) and the corresponding terminal 6 as well as reserve necessary resources in the target cell 2a so that a new end-to-end connection between the mobile terminal 4 and the corresponding terminal 6 is available for the ongoing communication as soon as the handoff to the target cell 2a occurs.

The network 1 may further include geographic location manager (GLM) 3 that is a control/management entity for network 1. GLM 3 may receive and store information pertaining to the geographic location of active or registered terminals. Such information pertaining to the geographic location of active or registered terminals may be gathered from satellite positioning systems including, but not limited to, the Global Positioning System (GPS), which is well known in the art of communications. For the present description, reference will be made to GPS, although the present invention is not limited to use of only GPS.

For a subscriber who requests the QoS assurance provided by the present invention, the GLM 3 may gather GPS information regarding the geographic location of a mobile terminal 4 in the network 1 to which the terminal is registered. Based on the gathered information, the GLM may compute a probability density function, which is a normalized histogram, of the exact location of the active subscriber mobile terminal 4. The histogram may be refined with each additional geographic location update of the subscriber mobile terminal 4, which may occur, for example, every time the subscriber mobile terminal 4 re-registers with the network operator (not shown) of network 1 as the subscriber mobile terminal 4 moves from one cell to another, from cell 2a to 2b in FIG. 1, or at predetermined time intervals. The GLM 3 may provide normalized histograms regarding the geographic location of subscriber mobile terminal 4 across network 1 to the network operator, which may include, but is not limited to, the transport entities of the respective cells, which include, but are not limited to, AG1-AG3.

Figure 2:
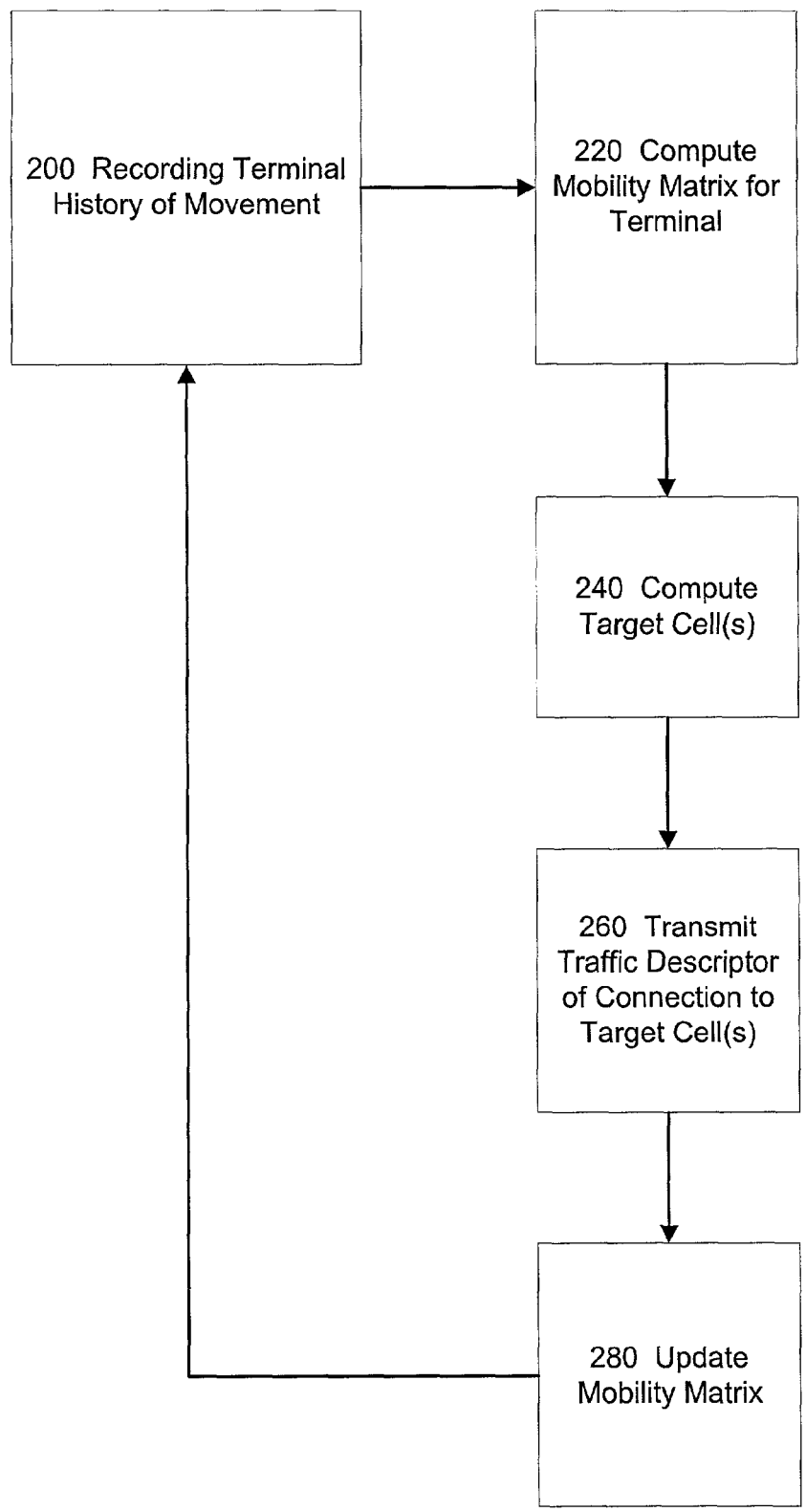
FIG. 2 is a flowchart showing an example of a method according to the present invention.

Explanation of an example embodiment of invention will now be further explained in reference to the flow chart of FIG. 2. The example embodiment further refers to FIG. 1 in which a registered terminal, which is subscribed to a particular network, moves among cells 2a through 2c in the network 1, although the present invention and application thereof is in no way limited thereto. In addition, the example embodiment of the invention may be implemented by a program run by the network entities described herein.

After subscribing to the services offered by the network services provider associated with network 1, as mobile terminal 4 moves among cells 2a to 2c in the network 1, GLM 3 may gather information from GPS to monitor all movement of the mobile terminal 4 within the network 1 and may further maintain such tracking information in a GLM database, as in step 200. With each recorded movement of the mobile terminal 4 within the network 1, or at predetermined time intervals, GLM 3 may update a normalized histogram as in step 220, which includes a probability distribution of the exact movements of the mobile terminal 4 among the adjacent ones of cells 2a through 2c. GLM 3 may continue to monitor movement of the mobile terminal 4 in network 1, as in step 220, and with each recorded movement of the mobile terminal 4 within the network 1, or at predetermined time intervals, GLM 3 may transmit the updated histogram for mobile terminal 4 to the network operator of network 1.

Thus, a normalized pattern for the movement of mobile terminal 4 within the network 1 may be established. The histograms may include information regarding the movement pattern of mobile terminal 4 among adjacent ones of cells 2a through 2c in the network 1. Accordingly, the services provided by the present invention may have significant appeal to commuters, couriers, or any other people who have regular commuting or traveling habits, though application of the present invention is in no way limited thereto.

As shown in step 240, QoS management according to the present invention may use the mobility history of mobile terminal 4 obtained in step 220 to predict the adjacent target cell that the ongoing communication session between the mobile terminal 4 and its corresponding terminal 6 will be handed off to. Thus, as mobile terminal 4 moves from cell 2a to cell 2b, in the example of FIG. 1, AG 5a may transfer the necessary context (e.g., the traffic descriptor of the present connection between mobile terminal 4 in cell 2a and network 1) to AG 5b, which is the target AG, so that AG 5b has sufficient time to reserve the necessary resources and mechanisms, including appropriate priority schemes, so that handoff of the ongoing communication session from AG 5a to AG 5b may be completed quickly, with minimal delay and minimal performance degradation.

QoS management according to the present invention may be predicated upon a mobility matrix of the mobile terminal 4 among the adjacent cells 2a through 2c in network 1. The mobility matrix is computed as part of the analysis in step 220 of FIG. 2. In accordance with the description set forth above, GLM 3 may obtain a mobility matrix by computing the normalized histogram of movements of mobile terminal 4, as well as every other terminal in the network, from cell to cell within network 1. GLM 3 updates the mobility matrix upon each transition of a mobile terminal between cells. The network operator may maintain either a mobility matrix per user that reflects each terminal's specific mobility history or an aggregated mobility matrix that reflects the collective mobility pattern of all terminals in the network. In addition, the mobility matrix may be computed based on the history taken at the same time of the day, week or even month of the year, to thereby ensure that the mobility matrix reflects the temporal and spatial behavior of the terminals. The temporal behavior specifically represents the movement pattern of the mobile terminals during a particular time of day and the spatial behavior represents the movement patterns of mobile terminals regardless of the time of day.

The mobility matrix, which provides a probability that mobile terminal 4 will move to a target adjacent cell is given as:

$$P=[p(n|k)], \text{ wherein } 1<n \text{ and } k<M;$$

For the mobility matrix, the cells within the network 1 are labeled 1 through "M"; "p(n|k)" denotes the probability of the movement of mobile terminal 4 from cell k to cell n; "k" is the present cell in which mobile terminal 4 is located; and "n" is a target adjacent cell.

For instance, with regards to the example wireless network of FIG. 3a, which includes network 11 and seven micro cells 21-27, the a 7×7 mobility matrix is computed as follows:

TABLE 1

| 0 | 0.2 | .05 | 0.5 | 0.2 | 0.01 | 0.04 |
|---|---|---|---|---|---|---|
| 0.5 | 0 | 0.4 | 0 | 0 | 0 | 0.1 |
| 0.3 | 0.3 | 0 | 0.4 | 0 | 0 | 0 |
| 0.3 | 0 | 0.3 | 0 | 0.4 | 0 | 0 |
| 0.6 | 0 | 0 | 0.1 | 0 | 0.3 | 0 |
| 0.5 | 0 | 0 | 0 | .05 | 0 | 0.45 |
| 0.45 | 0.45 | 0 | 0 | 0 | 0.1 | 0 |

For the wireless network shown in FIG. 3b having network 40, macro-cell 34 and micro cells 31-33, a 4×4 mobility matrix is computed as follows:

TABLE 2

| 0 | .3 | .2 | .5 |
|---|---|---|---|
| .2 | 0 | .2 | .6 |
| .3 | .2 | 0 | .5 |
| .2 | .4 | .4 | 0 |

Once GLM 3 has computed the mobility matrix, as in step 220, a decision regarding a target cell, or cells, from the present cell k to one of its "L" adjacent cells is a "L hypothesis test" (240). If φ is a set of the L neighboring cells of cell k, the target cell t∈φ is the cell that maximizes $p(n|k)|_{n=t}$; {n∈φ}.

That is, the target cell "t" may be the cell that maximizes the likelihood test. It should be noted that the computation of the target cell may actually result in multiple target cell. That is, the highest likelihood that the terminal may move from its present cell to more than one other target cell may be equal.

Figure 3A:
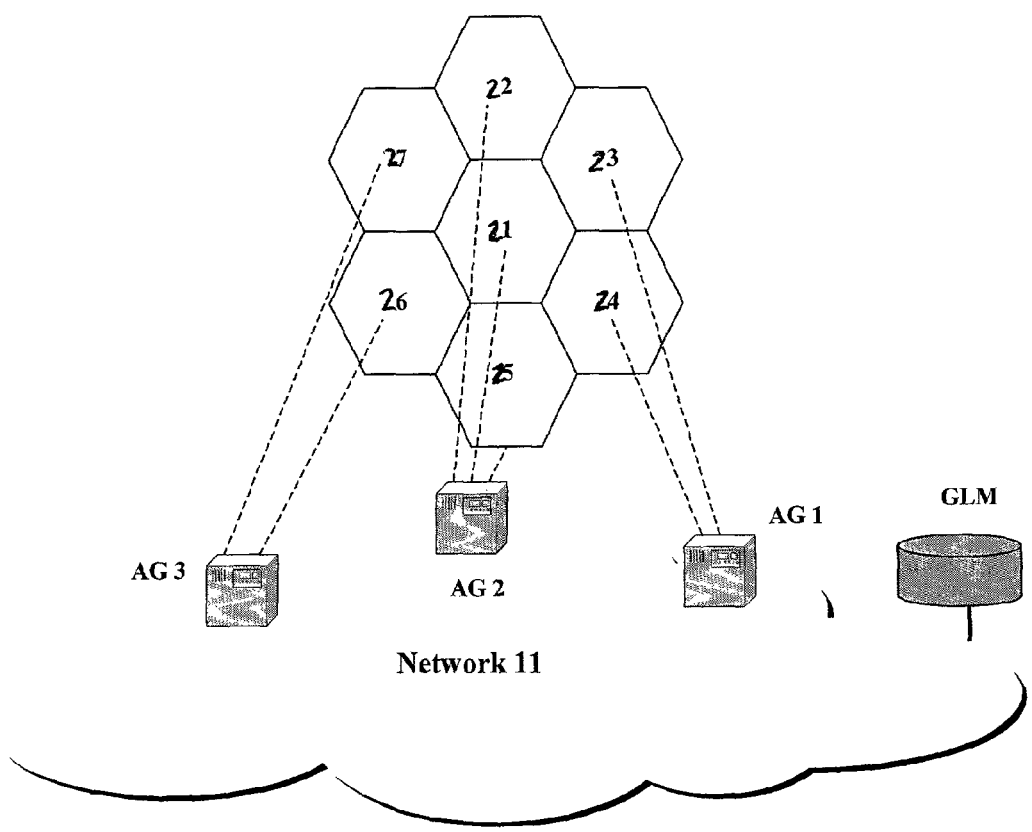
FIGS. 3a and 3b are examples of cells within wireless networks in which the present invention may be utilized.
Figure 3B:
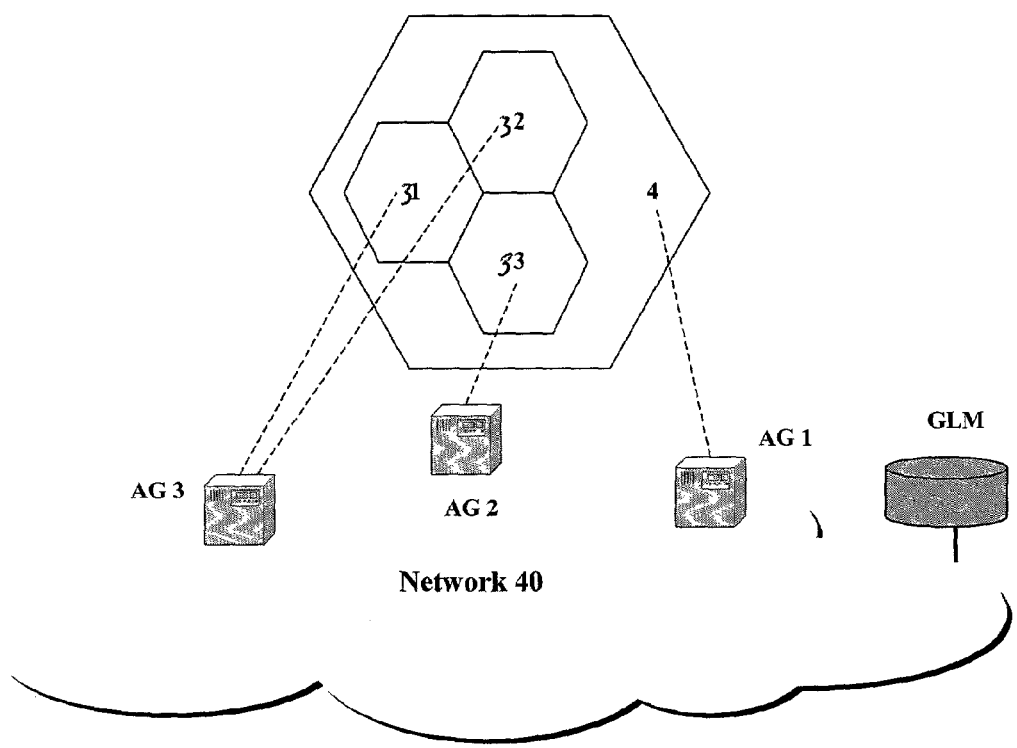

Therefore, if mobile terminal 4 is in cell 21 of FIG. 3a, the first row of its mobility matrix in Table 1 indicates that the target cell may be cell 24. However, for instance, if the mobile terminal 4 is in cell 27, the target cell may be either of cell 21 or 22. In the example of FIG. 3b, the mobility matrix in Table 2 may indicate that if mobile terminal 4 is in macro cell 34, it is equally likely to end up in any of cells 2 or 3, whereas if the mobile terminal 4 is in micro cell 31, its target cell may be macro cell 34.

After the target cell, or cells, "t" has been determined in the manner described above in step 240, the access gateway AG of the cell in which mobile terminal 4 is currently located forwards the necessary connection information to the access gateway(s) AG(s) of the target cell(s). Therefore, in the example of FIG. 1, step 260 of FIG. 2 may include AG 5a transmitting the session context (e.g., traffic descriptor, etc.) of the present connection between mobile terminal 4 in cell 2a and network 1, including bandwidth requirements and priority scheme, to AG 5b of cell 2b, if cell 2b is found to be the cell that maximizes the probability function set forth above.

Continuing with the example of FIG. 1, AG 5b, which is the target access gateway in the target cell 2b, may serve as a resource management proxy on behalf of mobile terminal 4 to ensure that the handoff is without delay and diminishment of parameters. If the target cell(s) does not have sufficient resources to ensure a high level of QoS for the connection between mobile terminal 4 and network 1, AG 2b may transmit a message to mobile terminal 4 to so inform the user thereof, so that the user of mobile terminal 4 may decide whether to terminate the connection, to remain in cell 2a or to take continue roaming in another direction.

Upon handoff of the connection for mobile terminal 4 to the target cell, GLM 3 may update the mobility matrix accordingly to support the roaming of mobile terminal 4 within network 1.

The present invention is predicated, in part, upon a probability distribution of a mobile terminal's movements across a wireless network. Thus, it may predict a target cell with a certain statistical accuracy/confidence and "guarantees" the handoff QoS with a certain statistical assurance/confidence, though not with absolute certainty.

This concludes the description of the example embodiments. Although the present invention has been described with reference to illustrative embodiments thereof, it should be understood that numerous other modifications and embodiments can be devised by those skilled in the art that will fall within the scope and spirit of the principles of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

We claim:

1. A method of managing quality of service for a terminal connected to a present cell in a network, comprising:
   recording a history of movements of said terminal among at least adjacent cells for each cell in said network;
   performing in a processor a statistical analysis of the recorded history of movements of said terminal to produce a mobility matrix, where said mobility matrix is a two-dimensional matrix and provides, for each cell in the network, a probability, for each cell adjacent to said cell, that said terminal when connected to said cell will next move to the adjacent cell;

storing the mobility matrix in a database in said network;

performing a hypothesis testing of cells adjacent to said present cell based on said mobility matrix;

predicting, based on the hypothesis testing, in said network a target cell to which said terminal will next move from the present cell, where the target cell is a cell adjacent to said present cell for which the probability, as provided in said mobility matrix, that said terminal will next move from the present cell to the target cell is a maximum value in the hypothesis testing;

allocating network resources in said target cell for said terminal; and updating the statistical analysis when said terminal moves from the present cell to an adjacent cell in said network.

2. The method of claim 1, wherein said filtering is performed by a geographic location manager that receives satellite-based positioning information regarding said terminal.

3. The method of claim 1, wherein said mobility matrix includes a statistical analysis of the movement of plural terminals in said network, with the movements of said plural terminals being updated in said mobility matrix, said mobility matrix being used by said plural terminals.

4. The method of claim 1, wherein said mobility matrix is computed based on a normalized histogram of movements of said terminal in said network.

5. The method of claim 1, wherein a separate mobility matrix is produced for each terminal.

6. A system for managing quality of service for a terminal connected to a present cell in a network, comprising:

a network processing system having a database that stores a mobility matrix of said terminal, where said mobility matrix is a two-dimensional matrix that provides, for each cell in said network, a probability, for each of at least two cells adjacent to said cell, that said terminal when connected to said cell will next move to the adjacent cell, said mobility matrix being updated in said database when the terminal moves to an adjacent cell; and a network entity in the present cell, wherein the network processing system computes the mobility matrix by performing a statistical analysis of a history of movements of said terminal among at least adjacent cells for each cell in said network, and predicts a target cell to which said terminal will next move from the present cell, where said predicting includes performing a hypothesis testing of cells adjacent to said present cell based on said mobility matrix and wherein the target cell is a cell adjacent to said present cell for which the probability, as provided in said mobility matrix, that said terminal will next move from the present cell to the target cell is a maximum value in the hypothesis testing, wherein the network entity informs the target cell of resources requirements of said terminal, wherein said network processing system includes a geographic location manager that receives satellite-based positioning information regarding said terminal, and wherein said network processing system computes a statistical analysis of received information about movements of said terminal in said network.

7. The system of claim 6, wherein said mobility matrix includes a statistical analysis of the movement of plural terminals in said network.

8. The system of claim 6, wherein said mobility matrix is computed based on a normalized histogram of movements of said terminal in said network.

9. The system of claim 6, wherein the network processing system computes a separate mobility matrix for each terminal.

10. A non-transitory computer-readable medium having computer-executable instructions for managing quality of service for a terminal connected to a present cell in a network, said computer-executable instructions comprising:

recording a history of movements of said terminal among at least adjacent cells for each cell in said network;

performing a statistical analysis of the recorded history of movements of said terminal to produce a mobility matrix, where said mobility matrix is a two-dimensional matrix and provides, for each cell in said network, a probability, for each cell adjacent to said cell, that said terminal when connected to said cell will next move to the adjacent cell;

storing the mobility matrix in a database of the network;

performing hypothesis testing of cells adjacent to said present cell based on said mobility matrix;

predicting in said network a target cell for said terminal where the target cell is a cell adjacent to the present cell for which the probability, as provided in said mobility matrix, that said terminal will next move from the present cell to the target cell is a maximum value in the hypothesis testing;

allocating network resources in said target cell for said terminal; and updating the statistical analysis when said terminal moves from said present cell to an adjacent cell in said network, wherein said filtering is performed by a geographical location manager that receives satellite-based positioning information regarding said terminal, wherein said filtering includes performing a statistical analysis of the received information about movement in said network for two or more terminals, wherein said statistical analysis of the movement of said terminal in said network includes computing said mobility matrix of said terminal among adjacent cells for each cell in said network.

11. The non-transitory computer-readable medium of claim 10, wherein said mobility matrix includes a statistical analysis of plural terminals in said network and said mobility matrix is used to provide a probability for at least two adjacent cells adjacent to said present cell.

12. The non-transitory computer-readable medium of claim 10, wherein said mobility matrix is computed for movements of said terminal at predetermined time intervals.

13. The non-transitory computer-readable medium of claim 10, wherein said mobility matrix is computed based on a normalized histogram of movements of said terminal in said network.

14. The non-transitory computer-readable medium of claim 10, wherein a separate mobility matrix is produced for each terminal.

15. A method of managing quality of service for a terminal connected to a present cell in a network, comprising:

filtering received information from said present cell about movements of said terminal in said network including performing a statistical analysis of the received information about movements of said terminal in said network by computing in said network a mobility matrix regarding the movements of said terminal among at least adjacent cells for each cell in said network, where said mobility matrix is a two-dimensional matrix that provides for each of plural terminals in said network, a probability, for each cell in the network and each cell adjacent to said cell, that said terminal when connected to said cell will next enter the adjacent cell and wherein said statistical analysis is updated when said terminal moves from said present cell to an adjacent cell in said network;

storing the mobility matrix in a database of the network;

based on said mobility matrix, predicting in said network a target cell for said terminal, where the target cell is a cell adjacent to said present cell that said terminal will next enter from the present cell, where said predicting includes performing a hypothesis testing of cells adjacent to said present cell based on said mobility matrix and wherein the target cell is a cell adjacent to said present cell that has the maximum value in the hypothesis testing; and allocating network resources in said target cell for said terminal.

16. A system for managing quality of service for a terminal connected to a present cell in a network, comprising a network processing system; and a network entity in the present cell, said network processing system comprising:

a geographic location manager that receives satellite-based positioning information regarding said terminal; and a database for storing a mobility matrix where said mobility matrix provides for each of plural terminals in said network, a probability, for each cell in the network and each of at least two cells adjacent to said cell, that the terminal when connected to said cell will next enter the adjacent cell, said mobility matrix being updated in said database when the terminal moves to an adjacent cell, wherein the network processing system computes said mobility matrix by performing a statistical analysis of received information regarding movements of a terminal in said network and predicts a target cell for said terminal connected to said present cell in said network by performing a hypothesis testing of cells adjacent to said present cell based on said mobility matrix, where said target cell is the one of the adjacent cells that has the maximum value of the hypothesis testing, and wherein the network entity informs the target cell of resources requirements of said terminal.

17. A non-transitory computer-readable medium having computer-executable instructions for managing quality of service for a terminal connected to a present cell in a network, said computer-executable instructions comprising:

filtering, by a geographical location manager that receives satellite-based positioning information, received information about movements of two or more terminals in said network including performing a statistical analysis of the received information about movements of said terminals in said network by computing in said network a mobility matrix, where said mobility matrix is a two-dimensional matrix and provides, for each of said two or more terminals in said network, a probability, for each cell in the network and each of at least two cells adjacent to said cell, that the terminal when connected to said cell will next enter the adjacent cell and wherein said mobility matrix is computed for movements of said terminals at predetermined time intervals;

storing said mobility matrix in a network database;

predicting in said network a target cell for said terminal connected to said present cell wherein said predicting includes performing a hypothesis testing of cells adjacent to said present cell based on said mobility matrix where the target cell is a cell adjacent to the present cell that has the maximum value in the hypothesis testing;

allocating network resources in said target cell for said terminal; and updating the statistical analysis when said terminal moves to an adjacent cell in said network.

\* \* \* \* \*

UNITED STATES PATENT AND TRADEMARK OFFICE
CERTIFICATE OF CORRECTION

| | | |
|---|---|---|
| PATENT NO. | : 8,631,104 B2 | Page 1 of 1 |
| APPLICATION NO. | : 09/946796 | |
| DATED | : January 14, 2014 | |
| INVENTOR(S) | : Agrawal et al. | |

It is certified that error appears in the above-identified patent and that said Letters Patent is hereby corrected as shown below:

In the Specification

In Column 1, Line 24, delete "application'" and insert -- applications' --, therefor.

In Column 2, Line 36, delete "terminal'" and insert -- terminals' --, therefor.

In the Claims

In Column 9, Line 21, in Claim 16, delete "comprising" and insert -- comprising: --, therefor.

Signed and Sealed this
Thirty-first Day of March, 2015

Michelle K. Lee
*Director of the United States Patent and Trademark Office*